(12) United States Patent
Pendarakis et al.

(10) Patent No.: US 7,719,983 B2
(45) Date of Patent: May 18, 2010

(54) METHOD FOR AUTONOMIC SYSTEM MANAGEMENT USING ADAPTIVE ALLOCATION OF RESOURCES

(75) Inventors: Dimitrios Pendarakis, Westport, CT (US); Jeremy I. Silber, New York, NY (US); Laura Wynter, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1144 days.

(21) Appl. No.: 11/327,069

(22) Filed: Jan. 6, 2006

(65) Prior Publication Data

US 2007/0162601 A1 Jul. 12, 2007

(51) Int. Cl.
*H04J 1/16* (2006.01)
(52) U.S. Cl. .................. 370/235; 370/230; 370/231
(58) Field of Classification Search ................. 370/468, 370/230, 235, 231; 709/226
See application file for complete search history.

(56) References Cited

U.S. PATENT DOCUMENTS

| 5,077,661 A | 12/1991 | Jain et al. |
| 6,393,455 B1 * | 5/2002 | Eilert et al. ................. 718/105 |
| 6,584,488 B1 | 6/2003 | Brenner et al. |
| 6,785,889 B1 * | 8/2004 | Williams .................... 718/104 |
| 6,876,668 B1 | 4/2005 | Chawla et al. |
| 2002/0032850 A1 * | 3/2002 | Kauffman .................... 712/31 |
| 2004/0107281 A1 * | 6/2004 | Bose et al. .................. 709/226 |
| 2004/0136379 A1 * | 7/2004 | Liao et al. ............. 370/395.21 |
| 2004/0143664 A1 * | 7/2004 | Usa et al. .................... 709/226 |
| 2004/0210871 A1 * | 10/2004 | Hasegawa et al. .......... 717/120 |
| 2005/0038834 A1 * | 2/2005 | Souder et al. ............... 707/203 |

FOREIGN PATENT DOCUMENTS

| EP | 0346039 | 12/1989 |
| EP | 1469387 | 10/2004 |
| WO | WO2005017783 | 2/2005 |

OTHER PUBLICATIONS

International Search Report.
European Search Report dated Dec. 3, 2009.

* cited by examiner

*Primary Examiner*—Ricky Ngo
*Assistant Examiner*—Dewanda Samuel
(74) *Attorney, Agent, or Firm*—F. Chau & Associates, LLC

(57) ABSTRACT

An exemplary method of resource allocation is provided. A relationship is estimated between at least one controlled resource and at least one dependent parameter. A resource allocation of the at least one controlled resource is adjusted to effect a desired system goal expressed in terms of the at least one dependent parameter.

28 Claims, 3 Drawing Sheets

METHOD FOR AUTONOMIC SYSTEM MANAGEMENT USING ADAPTIVE ALLOCATION OF RESOURCES

GOVERNMENT RIGHTS STATEMENT

This invention was made with Government support under Contract No.: H98230-04-3-0001 awarded by the U.S. Department of Defense. The Government has certain rights in this invention.

BACKGROUND OF THE INVENTION

1. Field of the Invention

The present invention relates generally to the field of system resource allocation, and, more particularly, to system control via resource allocation to satisfy measurable performance objectives.

2. Description of the Related Art

System management generally involves one or more steps of resource allocation. A good allocation of resources is essential for maintaining efficient operation of the system, and generally results in neither over-provisioning which is costly, nor under-provisioning, which can sacrifice the quality of the system output. Indeed, effective allocation of the system resources is an important part of maintaining or exceeding system performance requirements and targets. Resources that can be allocated may include, but are not limited to, central processing unit ("CPU"), bandwidth, memory, database handles, threads, and CPU scheduler priority, and input/output ("I/O") scheduler priority.

One step in allocating resources involves defining one or more desired goals for the system functioning. As used herein, the term "goal" refers to the maximization/minimization of, the achievement of a desired upper/lower bound on, or attempting to achieve some target value of, some function of one or more measurable system characteristics. These characteristics may include measurements of the utilization of system resources, volume or quality measurements on system outputs, and the like. Inter-dependencies between resources may be very important when the goal is based on system resource utilization; that is, utilization of one resource may depend on the utilization of one or more other resources.

For example, in a computer system, the percentage of the CPU time used for an application running on the system (i.e., the application's CPU utilization) may depend on the amount of network bandwidth allocated to pass data to that application. In other words, in this example, CPU utilization and network bandwidth are two inter-dependent resources in a computer system. The system goals will often be expressed in terms of one resource. Consider, for example, a system with two resources, A and B. If resource A depends upon resource B, in the manner defined above, then, by adapting the allocation of resource B, one can indirectly control the utilization of resource A. In the above example, the resources can be equally swapped, and network bandwidth utilization can be controlled via the allocation of CPU resources.

Given different allocations of a specific resource, measurements of the system can be taken to determine the degree to which goals are satisfied. These measurements can be used to adaptively "learn" the relationships between resources of the system and system goals (recall that the system goal(s) may depend directly on utilization of some system resources). The relationships between resources and goals in systems are usually too complex to be known a priori, and difficult (or, as in stochastic systems, impossible) to obtain exactly. Thus, the learned estimates of these relationships can be very useful substitutes for exact relationships when deciding resource allocations in the system to achieve system goals.

In complex systems, which are precisely those systems that require control methods, the measurements are "noisy" (i.e., they include random variations over a short time scale), thereby making them inaccurate to some degree. Examples of these measurements in a computer system include the amount of CPU utilization by a particular process and the amount of memory utilization by a particular process. CPU utilization measurements may be "noisy" over short time intervals because they depend on (a) the complicated operation of operating system ("OS") schedulers, (b) background system processes that use an often time-varying amount of CPU utilization, and (c) different states of program execution that may cause temporary fluctuations in the CPU utilization.

Moreover, obtaining the measurements can often perturb the system. For example, consider an example of obtaining measurements of the quality of a system given a particular resource allocation. Building a model of the relationship between the resource and the quality of the system may require setting the system to many different resource allocation levels. However, perturbing the system by changing resource allocation levels, especially when done repeatedly, may result in oscillations of one or more dependent quantities in the system, including the system measurements that figure into the goal function(s)).

Other methods for system management often suffer from one or more of the following drawbacks:

(i) Ad-hoc: In a number of methods, the relationship between resources is neither known nor estimated. In the operation of such systems, resource allocation decisions can have unintended effects. In this case, resource allocation decisions that do not take into account the effects of changing one resource on one or more other resources can be referred to as "ad-hoc."

(ii) Non-adaptive: Other methods may attempt to take into account relationships across resources, such as in classic optimization-based resource allocation methods, which assume a structure for the relationships, but do not respond to changes in the operation of the system.

SUMMARY OF THE INVENTION

In one aspect of the present invention, a method of resource allocation is provided. The method includes the steps of estimating a relationship between at least one controlled resource and at least one dependent parameter; and adjusting a resource allocation of the at least one controlled resource to effect a desired system goal expressed in terms of the at least one dependent parameter.

In another aspect of the present invention, a machine-readable medium having instructions stored thereon for execution by a processor to perform a method of resource allocation is provided. The method includes the steps of estimating a relationship between at least one controlled resource and at least one dependent parameter; and adjusting a resource allocation of the at least one controlled resource to effect a desired system goal expressed in terms of the at least one dependent parameter.

In yet another aspect of the present invention, a system of resource allocation is provided. The system includes a system controller for (a) estimating a relationship between at least one controlled resource and at least one dependent parameter, and (b) adjusting a resource allocation of the at least one controlled resource to achieve a desired system goal expressed in terms of the at least one dependent parameter.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Figure 1:
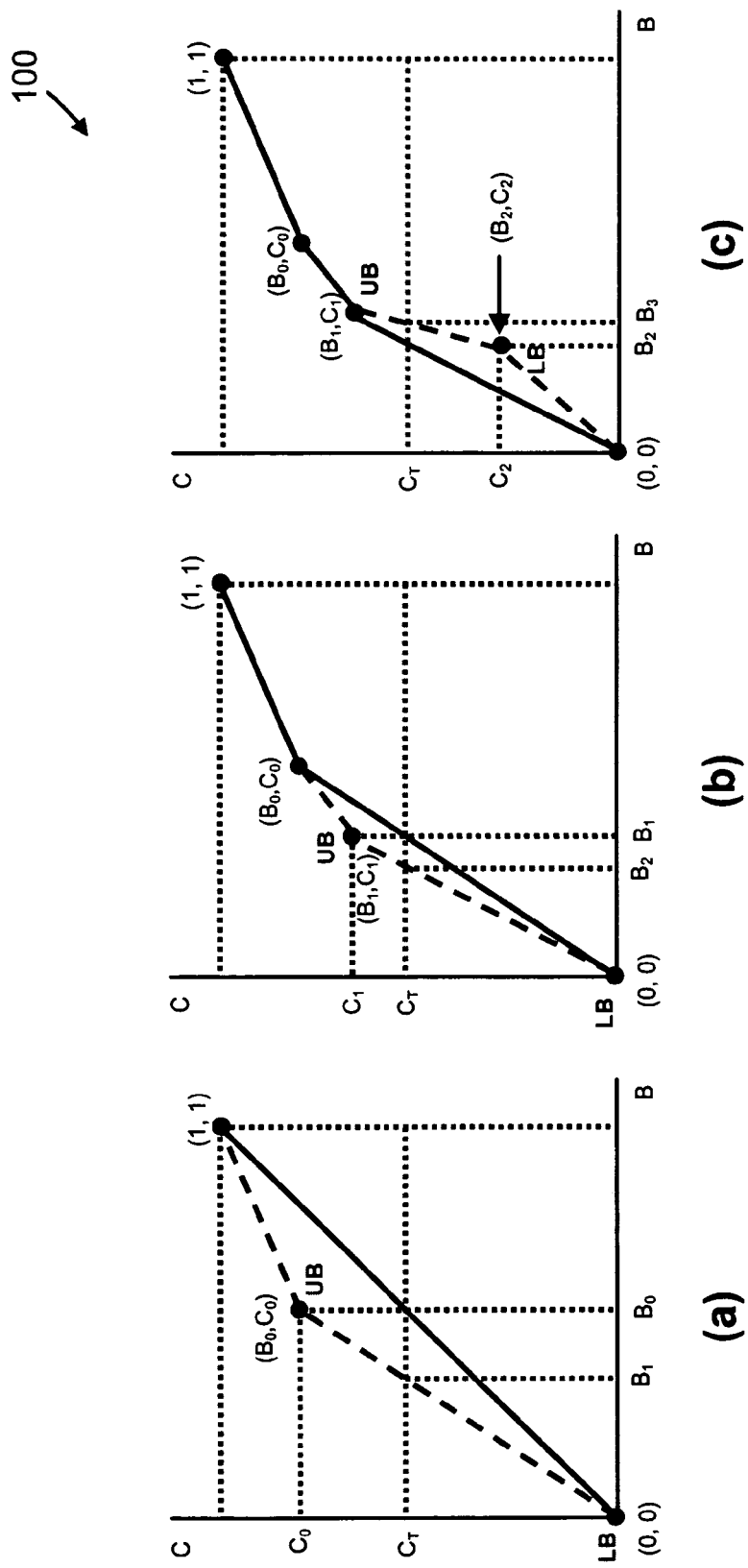
FIG. 1 depicts an exemplary evolution of an exemplary method of the present invention for the first three iterations as applied to a specific process, in accordance with one embodiment of the present invention.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more computer readable medium (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

In an exemplary embodiment of the present invention, a novel system controller is presented, which simultaneously performs the following:

(a) learns the relationship between the controlled resource(s) and the dependent parameters. In some controlled systems system goal function(s) are expressed in terms of the dependent parameters; and (b) adjusts resource allocation(s) of the controlled resource(s) to drive the system towards the desired goal points.

The simultaneous achievement of these two steps differentiates the present invention from prior art. Further, the described method is able to operate efficiently, requiring minimal state (i.e., minimal memory overhead in a software implementation, or minimal component complexity in an analog implementation) and with infrequent or no perturbations to the running system.

The resource allocation methods described herein may be applied to any of a variety of types of systems, as contemplated by those skilled in the art. Solely for illustrative purposes, the exemplary system illustrated herein concerns a computer system. However, it should be appreciated that the present invention is not so limited and may be applied to any system which can be controlled, including, but not limited to, manufacturing systems, logistic systems, and chemical systems.

The invention described herein may apply to any case where allocations of one or more controllable resources are adjusted to effect a desired system response (i.e., a goal). Further, the present invention does not rely on prior known models of resource and goal relationships.

We begin by summarizing some of the terminology used in the present invention. We assume that a complex system utilizes at least two resources for executing an application. One resource is referred herein as a controlled resource. The controlled resource is a resource in which a user of the complex system has control over its utilization. Dependent parameters are measurable characteristics of the system which are used in measuring how well the system is satisfying or approaching the desired goal(s). A controlled resource can also be a dependent parameter, if it figures into the goal function. The utilization level of another system resource (i.e., a system resource other than the controlled resource) may be a dependent parameter, in which case this other system resource may be equivalently referred to as a dependent resource. The value of the dependent parameter is dependent, at least in part, upon the allocation of the controlled resource. We use the term goal to refer generally to any measurable performance objective, which can be expressed in terms of minimizing, maximizing, or minimizing the error around some desired level of a goal function with parameters that may include the controlled resource and the dependent parameter(s). Exemplary embodiments of the present invention build an estimate of the relationship between the controlled resource(s) and the dependent parameter(s) that we refer to as the model.

We present exemplary methods for adaptively learning the relationship between one or more controlled resources and one or more dependent parameters in a complex system in which data concerning the level of satisfaction of a goal may be noisy (i.e., inaccurate). The relation can be used, for example, to determine a preferred allocation of a controlled resource to achieve performance targets measured in terms of the dependent parameter(s). The exemplary methods described herein are efficient and require minimal data storage, and, as such, may be particularly useful in real-time control of a complex system, in which resources must be allocated in a relatively short amount of time. The method is particularly preferable to existing art when applied to systems where altering resource allocations can cause significant perturbations to the system. Since the method is very economical in the number of times it requires the controlled resource allocation to be adjusted, the negative effects of such changes are smaller than those in existing methods.

The model (i.e., the estimated relationship between control resource(s) and dependent parameter(s)) may be initialized to a simple linear function or some other preset function. At each iteration (i.e., step) of the method, the controlled resource allocation is set, and one or more sample measurements of the dependent parameter are obtained at this controlled resource allocation so as to learn the relationship between the controlled resource allocation(s) and the dependent parameter(s). If more than one sample is taken, the samples may be combined in such a way as to reduce the impact of noise or inaccurate data (e.g., simple averaging, low-pass filtering). The controlled resource allocation and the dependent parameter measurement form a tuple.

After measuring the dependent parameter(s), the tuple (i.e., controlled resource allocation, dependent parameter measurement) is a data point in an n-dimensional space of real numbers ($R^n$). The model is updated by the addition of this tuple. In a preferred embodiment, the list of previously-recorded tuples can be connected by line segments to form a piece-wise linear function which is suitable for use as a model. However, only a few such tuples of the piecewise-linear model need to be stored at any time. For example, when the goal involves trying to achieve a particular utilization level (referred herein as a "target level") of a single dependent parameter which varies monotonically with a controlled resource, only two tuples will need to be stored, a lower bound and an upper bound, on either side of the target level (i.e., the tuple with the largest observed dependent parameter measurement that is less than the target, and the tuple with the smallest observed dependent parameter measurement that is greater than the target). The method described will then choose a new allocation of the controlled resource which is predicted to result in a new tuple with the dependent parameter measurement between the current upper and lower bounds. Thus the new allocation should become either the upper or the lower bound after the next iteration. In the above example, at each step, the distance between the two bounds decreases, as the points which are computed by the method are successively closer to the target level.

FIG. 1 shows an exemplary evolution 100 of an exemplary method of the present invention for the first three iterations (i.e., (a), (b) and (c)) as applied to a specific process. FIG. 1 depicts the piece-wise linear estimate of function C(B) at each iteration. $C_T$ is the target value. LB is the lower bound for each iteration, and UB is the upper bound for each iteration.

When a stopping criterion is reached, the best value of the controlled resource is provided for achieving the goal. Stopping criteria may include, but are not limited to, pre-determined distance from the target value, a maximum number of iterations, a maximum amount of elapsed real time, and the like.

Although not so limited, we present, for the sake of simplicity, an illustrative method of the present invention on a computing system that handles stream processing (e.g., streaming multimedia data). Another application of the present invention may include capacity allocation in logistic or manufacturing systems. In such systems, the controlled resource is the level of capacity to add to the system. The dependent parameter is the level of quality of logistic or manufacturing system, which is observable, but real-time measurements may be inaccurate. An exemplary goal for such a system is achieving a set of desired processing capacity allocations for the system. Another goal may include satisfying response time objectives. Yet another application of the present invention may be in chemical production and processing systems.

We now consider a typical computing system composed of a set of processes (e.g., running instances of some data-processing program) hosted on a single node. In this illustrative application, the controlled resource is network bandwidth, the dependent resource is the CPU, and the goal is a target number of CPU share on the node.

The method builds an estimate of the relationship between each controlled resource and the values of the dependent parameter(s) only, as opposed to estimating explicitly the relationships between many controlled resources and each dependent parameter. This approximation allows for the method to be very rapid and to require minimal data storage. Interactions across controlled resources affect the system in two ways: (a) through a constraint on the total amount of controlled resource available, and (b) through the noise in measurements.

More specifically, the goal of the system depends upon the unknown relationship between each dependent parameter and the controlled resource. The mapping describing each of these relationships is constructed iteratively, and the next value of the resource level is determined by examining the direction that leads to a value of the goal metric closer to the desired value.

At each iteration, sample measurements of the dependent parameter(s) are taken at the current allocation of the controlled resource. As these measurements may be noisy, multiple measurements may be taken. Using a statistical technique such as one which determines the expected value from a set of random measurements, a single expected value can be obtained. One example of such a technique is to remove outliers (i.e., measurements more than a given number of standard deviations from the mean of the measurements) and then to take the mean of the remaining values.

The expected value is then used to update the model. The expected value adjusts the piecewise-linear function so that the new point (i.e., controlled resource-goal value pair) is included in the model function. In other words, the piecewise-linear function has as many segments with different slopes as the number of iterations plus one.

For many goal functions, only two points need to be stored for each process since one segment of the relationship function will contain the target value within its lower and upper limit. At each iteration, in this example, either the upper or lower limit will be updated by a new point which is closer to the target value. Hence, the distance between the two extremities of the active piece will shrink at each step.

Let $C_i(B_i)$ be a smoothed estimate (e.g., an expected value) of the unknown relationship function for some value i. Then, $B_i$ represents the value of the controlled resource. The goal function which depends upon the unknown relation $C_i(B_i)$ is given by the notation F(B). The goal function may include n different components i=1 . . . n, each with its own relations to be learned by the method, $C_i(B_i)$.

Following are the steps of the method in an exemplary embodiment of the method in which the goal function is to try to achieve target values for the dependent parameter, in this case referred to as $C_i$.

(1) Initialization: The target values be referred to by the n-vector, T. Set iteration counter, j=1. Set initial controlled resource value to a given starting point $B_i$ or set to $B_i$=maximum_controlled_resource_capacity/n for every i=1, . . . n if no initial point is provided. Define the initial values $C_i(LB(i))$=0 and $C_i(UB(i))$=1, for all i=1, . . . n.

(2) Main loop: While the stopping criterion has not been reached, repeat:
  (a) Sample the usage level of each i with the current vector B. For each process i=1, ... n, set $C_i(B_i)$ to the smoothed or expected usage level of process i.
  (b) For each i=1, ... n, if $C_i(j)(B_i(j))>T_i$, the target level, then set UB(i)=j. Conversely, if $C_i(j)(B_i(j)))<t\_i$ then set LB(i)=j.
  (c) Direction finding: Determine the search direction, Gj(b) such that Gj(b)=(C(j)(B(j))−T)*Z(j)=(C(j)(B(j))−T)*M(j) where M is the vector of slopes of the piecewise-linear function C(B), evaluated in the direction towards the target value, T. That is, if, for process, i, the current iteration counter j is the upper bound, then Mi(j) is the gradient of the segment between point $C_i(j)(B(j))$ and $C_i(LB(i))(B(LB(i)))$. That is $M_i(j)=A_i(k)$ for some active piece k. Conversely, if j=LB(i), then Mi(j) is the gradient of the segment between point $C_i(j)(B(j))$ and $C_i(UB(i))(B(UB(i)))$.
  (d) Newton step: The Newton step is given by the gradient scaled by the norm of the Hessian. Since we model the goal function as one which is separable in the processes, the norm of the Hessian is given, for each application i, by the second derivative of the objective function F(j)(B) evaluated at the active piece. This is a very inexpensive and quick computation.
  (e) Step size computation: Use either a unit step or a divergent-series step, S(j)=w/(j+v), for some scalar constants, v and w.
  (f) Update: Set B(j+1)=B(j)−G(j)(B)*S(j), and set j=j+1.

Figure 2:
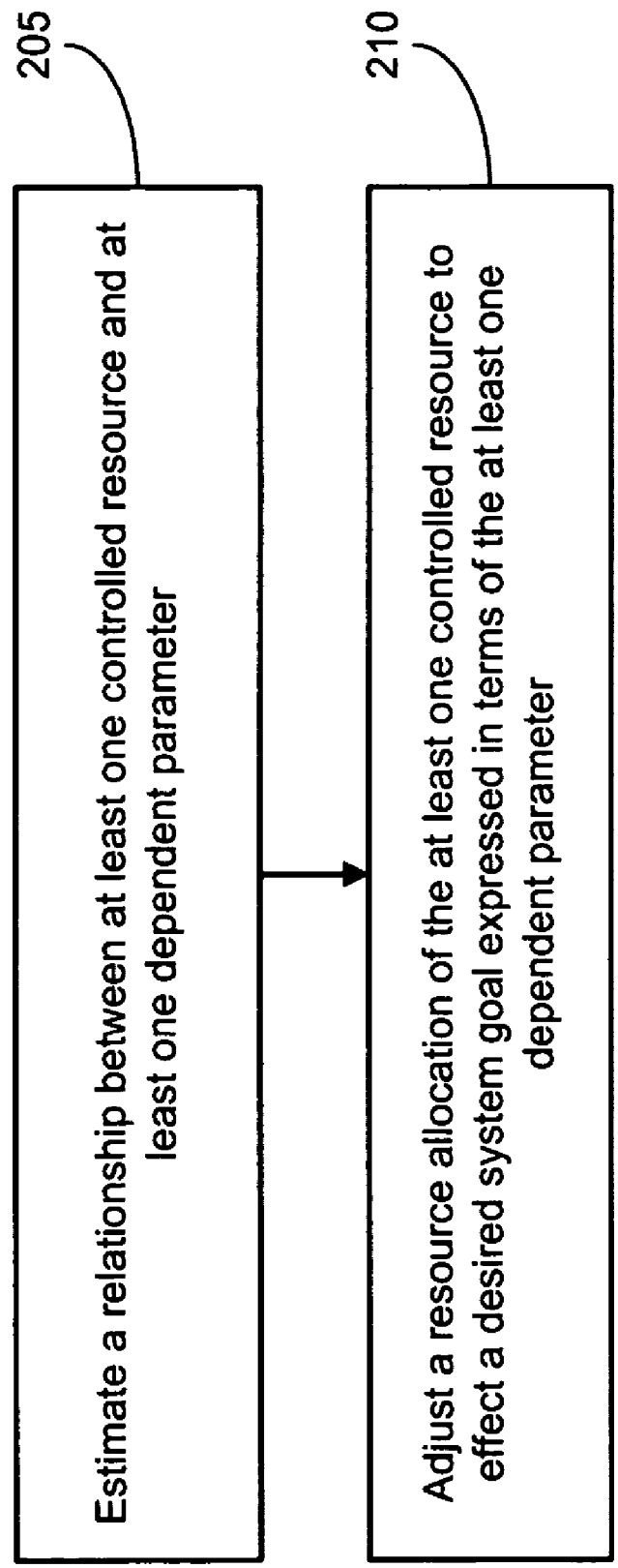
FIG. 2 depicts a flow diagram of an exemplary method of resource allocation, in accordance with one embodiment of the present invention.

FIG. 2 depicts a flow diagram of an exemplary embodiment of the present invention. A relationship is estimated (at 205) between at least one controlled resource and at least one dependent parameter. This relationship allows for the determination of how different allocations of the at least one controlled resource affects the at least one dependent parameter. A resource allocation of the at least one controlled resource is adjusted to effect a desired system goal expressed in terms of the at least one dependent parameter.

Figure 3:
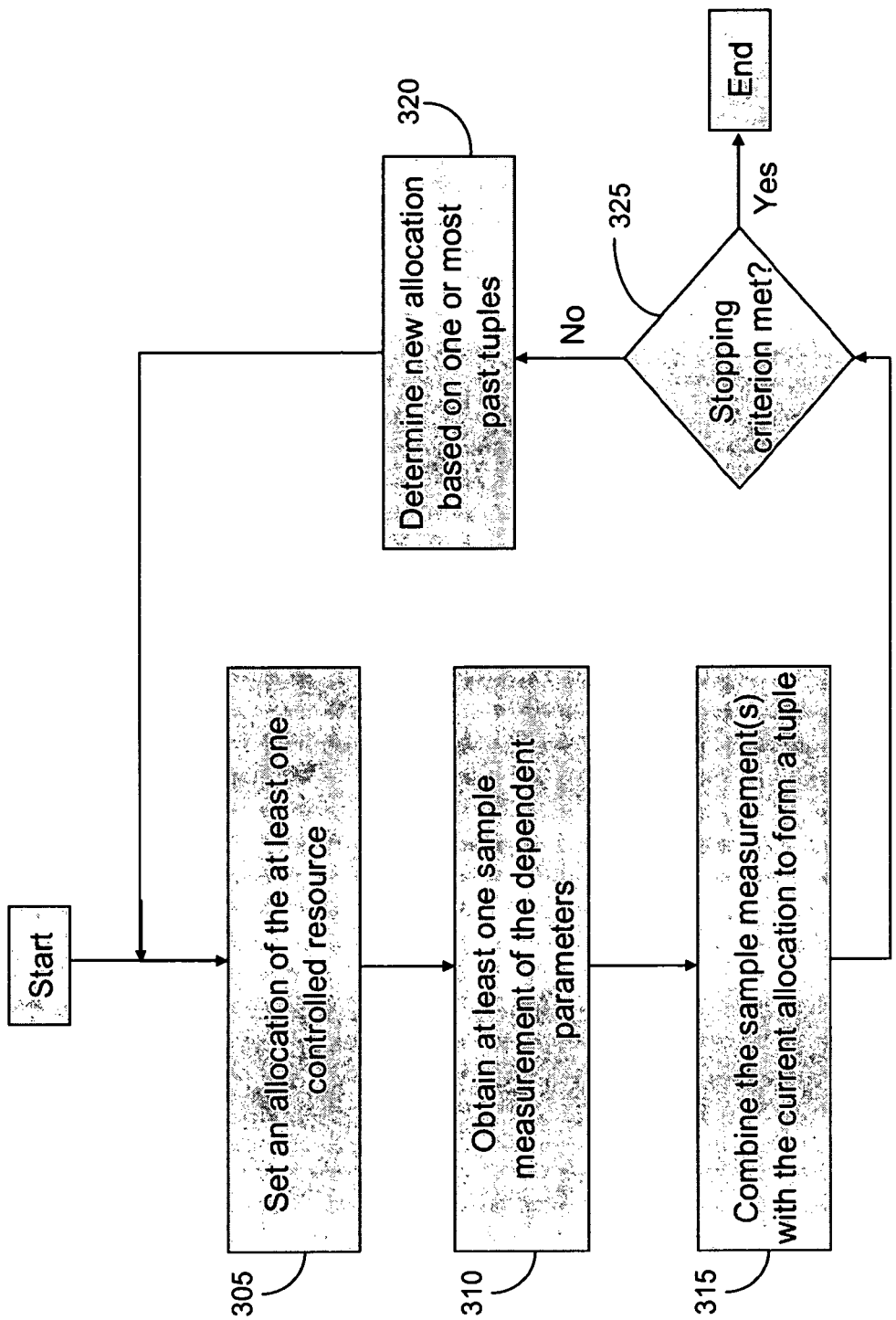
FIG. 3 depicts a flow diagram of an exemplary method of adjusting a resource allocation of the at least one controlled resource to effect a desired system goal expressed in terms of the at least one dependent parameter, in accordance with one embodiment of the present invention.

FIG. 3 depicts a flow diagram of an exemplary method of adjusting a resource allocation of the at least one controlled resource to effect a desired system goal expressed in terms of the at least one dependent parameter. A current allocation of the at least one controlled resource is set (at 305). At least one sample measurement of the at least one dependent parameter is obtained (at 310) at the current allocation. The at least one sample measurement is combined (at 315) with the current allocation to form a tuple. A new allocation is determined (at 320) based on at least one previous tuple. The previous steps (305 to 320) are repeated (at 325) until the tuple satisfies a stopping criterion.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of resource allocation of processing time in a processor, comprising:
  estimating a relationship between the processing time and a network bandwidth; and
  adjusting a resource allocation of the processing time to effect a desired system goal expressed in terms of the network bandwidth, wherein adjusting the resource allocation comprises,
  (a) setting a current allocation of the processing time,
  (b) obtaining at least one sample measurement of the network bandwidth at the current allocation,
  (c) combining the at least one sample measurement with the current allocation to form a tuple, and
  (d) determining a new allocation based on a previous tuple and the tuple, wherein an upper bound and a lower bound each correspond to one of the previous tuple and the tuple, respectively, based upon a value of each tuple, and a value of the system goal is no more than the upper bound and no less than the lower bound, wherein the upper bound represents a first measure of processing time corresponding to a smallest observed network bandwidth measurement greater than the system goal and the lower bound represents a second measure of processing time corresponding to a largest observed network bandwidth measurement less than the system goal, wherein the method is performed by the processor.

2. The method of claim 1, wherein the steps of estimating and adjusting are performed simultaneously.

3. The method of claim 1, wherein the steps of estimating and adjusting are performed in sequence.

4. The method of claim 1, wherein the steps of estimating and adjusting are repeated.

5. The method of claim 1, wherein at least one of the processing time, the network bandwidth, or the desired system goal is subject to at least one of noise or stochastic variations.

6. The method of claim 1, wherein the desired system goal comprises one of:
  a desired utilization level of the network bandwidth;
  a minimization of a distance metric between the desired utilization level and an actual utilization level of the network bandwidth;
  a maximization of the network bandwidth; or
  a minimization of the network bandwidth.

7. A computer readable medium embodying instructions executed by a processor to perform a method of resource allocation, the method comprising:
  estimating a relationship between at least one controlled resource and at least one dependent parameter; and
  adjusting a resource allocation of the at least one controlled resource to effect a desired system goal expressed in terms of the at least one dependent parameter, wherein adjusting the resource allocation comprises,
  (a) setting a current allocation of the at least one controlled resource,
  (b) obtaining at least one sample measurement of the at least one dependent parameter at the current allocation,
  (c) combining the at least one sample measurement with the current allocation to form a tuple, and
  (d) determining a new allocation based on a previous tuple and the tuple, wherein an upper bound and a lower bound each correspond to one of the previous tuple and the tuple, respectively, based upon a value of each tuple, and a value of the system goal is no more than the upper bound and no less than the lower bound.

8. The computer readable medium of claim 7, wherein the steps of estimating and adjusting are performed simultaneously.

9. The computer readable medium of claim 7, wherein the steps of estimating and adjusting are performed in sequence.

10. The computer readable medium of claim 7, wherein the steps of estimating and adjusting are repeated.

11. The computer readable medium of claim 7, wherein at least one of the at least one controlled resource, the at least one dependent parameter, or the desired system goal is subject to at least one of noise or stochastic variations.

12. The computer readable medium of claim 7, wherein the desired system goal comprises one of:
- a desired utilization level of the at least one dependent parameter;
- a minimization of a distance metric between the desired utilization level and an actual utilization level of the at least one dependent parameter;
- a maximization of the at least one dependent parameter; or
- a minimization of the at least one dependent parameter.

13. A system of resource allocation, comprising:
- a system controller comprising a processor and a memory for estimating a relationship between at least one controlled resource and at least one dependent parameter; and
- adjusting a resource allocation of the at least one controlled resource to achieve a desired system goal expressed in terms of the at least one dependent parameter, wherein adjusting the resource allocation comprises,
  (a) setting a current allocation of the at least one controlled resource,
  (b) obtaining at least one sample measurement of the at least one dependent parameter at the current allocation,
  (c) combining the at least one sample measurement with the current allocation to form a tuple, and
  (d) determining a new allocation based on a previous tuple and the tuple, wherein an upper bound and a lower bound each correspond to one of the previous tuple and the tuple, respectively, based upon a value of each tuple, and a value of the system goal is no more than the upper bound and no less than the lower bound.

14. The system of claim 13, further comprising:
- a computer system comprising a central processing unit (CPU), the computer system operatively connected to the system controller;
- wherein the system controller adjusts the resource allocation of CPU in the computer system.

15. The system of claim 13, further comprising:
- a complex system capable of controlling the at least one controlled resource.

16. The system of claim 13, wherein the system controller performs the steps of estimating and adjusting simultaneously.

17. The system of claim 13, wherein the system controller performs the steps of estimating and adjusting in sequence.

18. The system of claim 13, wherein at least one of the at least one controlled resource, the at least one dependent parameter, or the desired system goal is subject to at least one of noise or stochastic variations.

19. The system of claim 13, wherein the desired system goal comprises one of:
- a desired utilization level of the at least one dependent parameter;
- a minimization of a distance metric between the desired utilization level and an actual utilization level of the at least one dependent parameter;
- a maximization of the at least one dependent parameter; or
- a minimization of the at least one dependent parameter.

20. The method of claim 1, wherein step (b) comprises obtaining a plurality of sample measurements of the network bandwidth at the current allocation and combining the plurality of sample measurements to form an expected value of the network bandwidth, and step (c) comprises combining the expected value of the network bandwidth with the current allocation to form a tuple.

21. The method of claim 1, further comprising repeating steps (a) through (d) until a stopping criterion is satisfied.

22. The method of claim 21, wherein the stopping criterion comprises one of:
- a pre-determined distance from a target utilization level;
- a maximum number of iterations; and
- a maximum amount of elapsed real time.

23. The computer readable medium of claim 7, wherein step (b) comprises obtaining a plurality of sample measurements of the at least one dependent parameter at the current allocation and combining the plurality of sample measurements to form an expected value of the at least one dependent parameter, and step (c) comprises combining the expected value of the at least one dependent parameter with the current allocation to form a tuple.

24. The computer readable medium of claim 7, further comprising repeating steps (a) through (d) until a stopping criterion is satisfied.

25. The computer readable medium of claim 24, wherein the stopping criterion comprises one of:
- a pre-determined distance from a target utilization level;
- a maximum number of iterations; and
- a maximum amount of elapsed real time.

26. The system of claim 13, wherein step (b) comprises obtaining a plurality of sample measurements of the at least one dependent parameter at the current allocation and combining the plurality of sample measurements to form an expected value of the at least one dependent parameter, and step (c) comprises combining the expected value of the at least one dependent parameter with the current allocation to form a tuple.

27. The system of claim 13, further comprising repeating steps (a) through (d) until a stopping criterion is satisfied.

28. The system of claim 27, wherein the stopping criterion comprises one of:
- a pre-determined distance from a target utilization level;
- a maximum number of iterations; and
- a maximum amount of elapsed real time.

* * * * *